United States Patent [19]

Mancheron

[11] Patent Number: 5,125,467
[45] Date of Patent: Jun. 30, 1992

[54] TELECONTROLLED TRACKED VEHICLE

[76] Inventor: Daniel Mancheron, RN 8, Les Chabauds, F-13320 Bouc-Bel-Air, France

[21] Appl. No.: 598,669

[22] PCT Filed: Apr. 26, 1989

[86] PCT No.: PCT/FR89/00199
§ 371 Date: Oct. 26, 1990
§ 102(e) Date: Oct. 26, 1990

[87] PCT Pub. No.: WO89/10290
PCT Pub. Date: Nov. 2, 1989

[30] Foreign Application Priority Data
Apr. 26, 1988 [FR] France ............... 88 05724

[51] Int. Cl.$^5$ ............................................. B62D 6/00
[52] U.S. Cl. ............................. 180/6.48; 180/6.7; 180/9.44; 180/9.46; 364/424.01; 364/426.01
[58] Field of Search ................ 180/14.2, 6.2, 6.48, 180/6.64, 6.7, 9.44, 9.46, 9.48, 9.5, 9.52; 364/424.01, 424.02, 426.01

[56] References Cited

U.S. PATENT DOCUMENTS

| | | | |
|---|---|---|---|
| 1,669,345 | 5/1928 | Owens | 180/9.46 |
| 3,419,097 | 12/1968 | Nodwell et al. | 180/9.46 |
| 3,447,619 | 6/1969 | Nodwell et al. | 180/9.46 |
| 3,455,405 | 7/1969 | Parent | 180/9.46 |
| 3,848,690 | 11/1974 | Hawkins | 180/6.48 |
| 3,917,015 | 11/1975 | Hawkins | 180/6.48 |
| 4,616,724 | 10/1986 | Lemke | 180/6.48 |
| 4,768,601 | 9/1988 | Okano | 180/24.07 |
| 4,837,694 | 6/1989 | Narita et al. | 180/6.48 |

FOREIGN PATENT DOCUMENTS

| | | |
|---|---|---|
| 0252674 | 1/1988 | European Pat. Off. |
| 2053092 | 5/1972 | Fed. Rep. of Germany |
| 3135485 | 3/1983 | Fed. Rep. of Germany |
| 3514375 | 10/1986 | Fed. Rep. of Germany |
| 2553349 | 4/1985 | France |
| 1361419 | 7/1974 | United Kingdom |

Primary Examiner—Charles A. Marmor
Assistant Examiner—A. M. Boehler
Attorney, Agent, or Firm—Sandler, Greenblum & Bernstein

[57] ABSTRACT

A tracked vehicle is provided for the transportation of loads and/or the supply of energy to areas having difficult access or to dangerous regions. The tracked vehicle is supported by an assembly of four banks of tracks, each driven by an independent hydraulic drive motor and directionally orientable. The vehicle includes an electronic control device for differential powering the four tracks in accordance with the distance travelled by each of the tracks.

7 Claims, 8 Drawing Sheets

TELECONTROLLED TRACKED VEHICLE

FIELD OF THE INVENTION

The present invention concerns a telecontrolled four-track vehicle for the transportation of loads and/or supply of energy in areas of difficult access or dangerous for man, with no one on board.

DESCRIPTION OF THE RELATED ARTS

All-terrain vehicles are already well-known, and are capable of moving on uneven surfaces, and their track laying gear is constituted of four tracks.

The disadvantages of these vehicles are:
they necessitate the presence of at least one driver for the piloting of the said vehicle; and
they do not offer, therefore, any security for the life of the personnel, on board, embarked in order to accomplish dangerous tasks.

Such types of vehicle, for example, are described in document EP-A-0,252,674, and they have, moreover, an additional number of disadvantages such as:
they must provide for at least two energy supply centers, one in order to ensure the movement of the vehicle, and the other to allow the tools and the machinery on board to be driven;
they necessitate the use of at least two hydraulic pumps;
the difficulty in synchronizing the hydraulic motors, due to the manual management of the differentials and due to the fact that these pumps have fixed output and that the motors are mounted in parallel;
bad surface tracking by the track laying gear; and
their mediocre maneuverability on very rough surfaces.

The main object of the present invention is to rectify the above-mentioned disadvantages and insufficiencies of present all-terrain vehicles.

SUMMARY OF THE INVENTION

According to the invention, this object is achieved by deploying either a procedure or a device according to which the vehicle is supported and moved by an assembly of four independent banks of tracks, at least two of which constitute the front train or the rear train of the vehicle, and are orientable, the vehicle being remarkable by the fact that it comprises an electronic device for the differential piloting of the four tracks, this electronic device determining the speed of each track according to the following: the track position; to whether the track is orientable or not; to the geometry of the vehicle; to the set point of speed (V0); and the steering angle of the orientable train.

According to another characteristic arrangement, only one energy center supplies, simultaneously or otherwise, the drive of the vehicle as well as the tools embarked on board of the vehicle.

The vehicle with independent tracks according to the invention has the following main advantages:
of permitting the movement of loads in difficult access zones such as surfaces with a slope more than 40°;
of enabling the energy supply of a wide range of tools;
of enabling the security of the driving personnel;
of allowing, thanks to its reduced weight, the heliwinching of the vehicle; and
of being able to be used in a number of fields such as: public works, mountainous works, forest works, agricultural works, petro chemicals, civil protection, military applications, etc.

BRIEF DESCRIPTION OF THE DRAWINGS

The objects, characteristics, and advantages that have been mentioned above and others, will be clearer from the description that follows, and from the annexed drawings to which.

DETAILED DESCRIPTION OF THE INVENTION

Hereafter is described in order:
the mechanical and kinematic conception of the vehicle; and
an embodiment of the energy subsystem;
the electric control-check device.

MECHANICAL AND KINEMATIC CONCEPTION OF THE VEHICLE

Figure 1A:
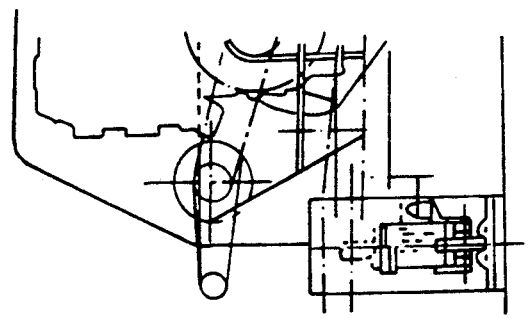
FIG. 1a is a semi cutaway side view of FIG. 1.
Figure 1:
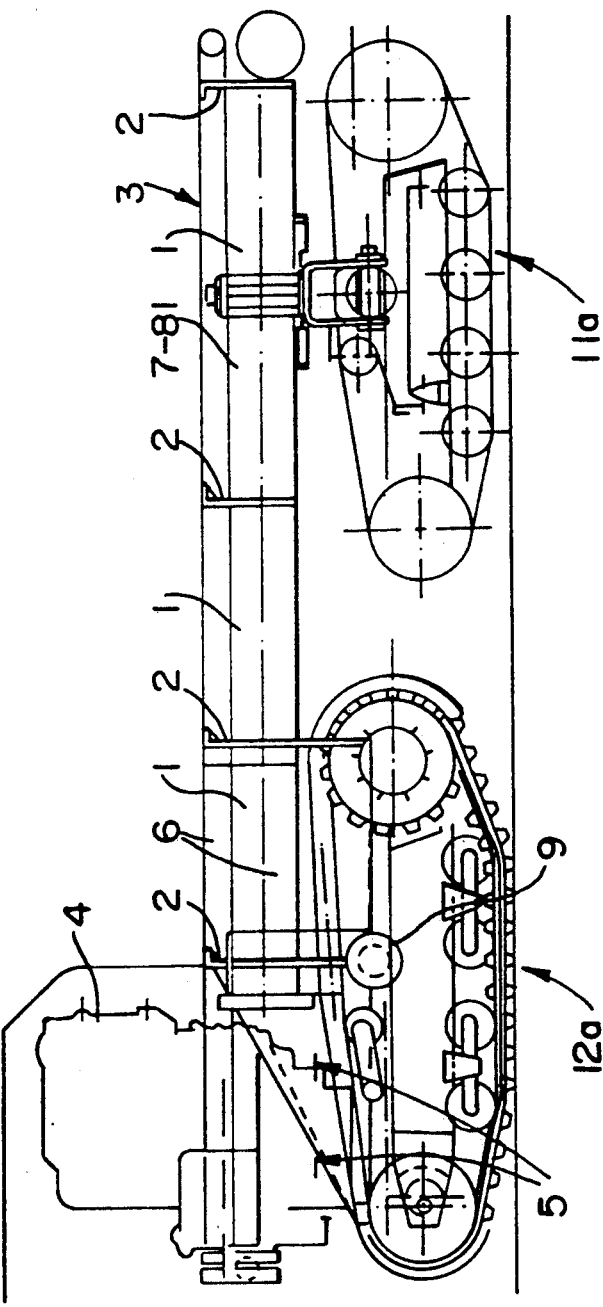
FIG. 1 is an elevational view of the vehicle equipped with four independent tracks according to a first embodiment of the invention.
Figure 2:
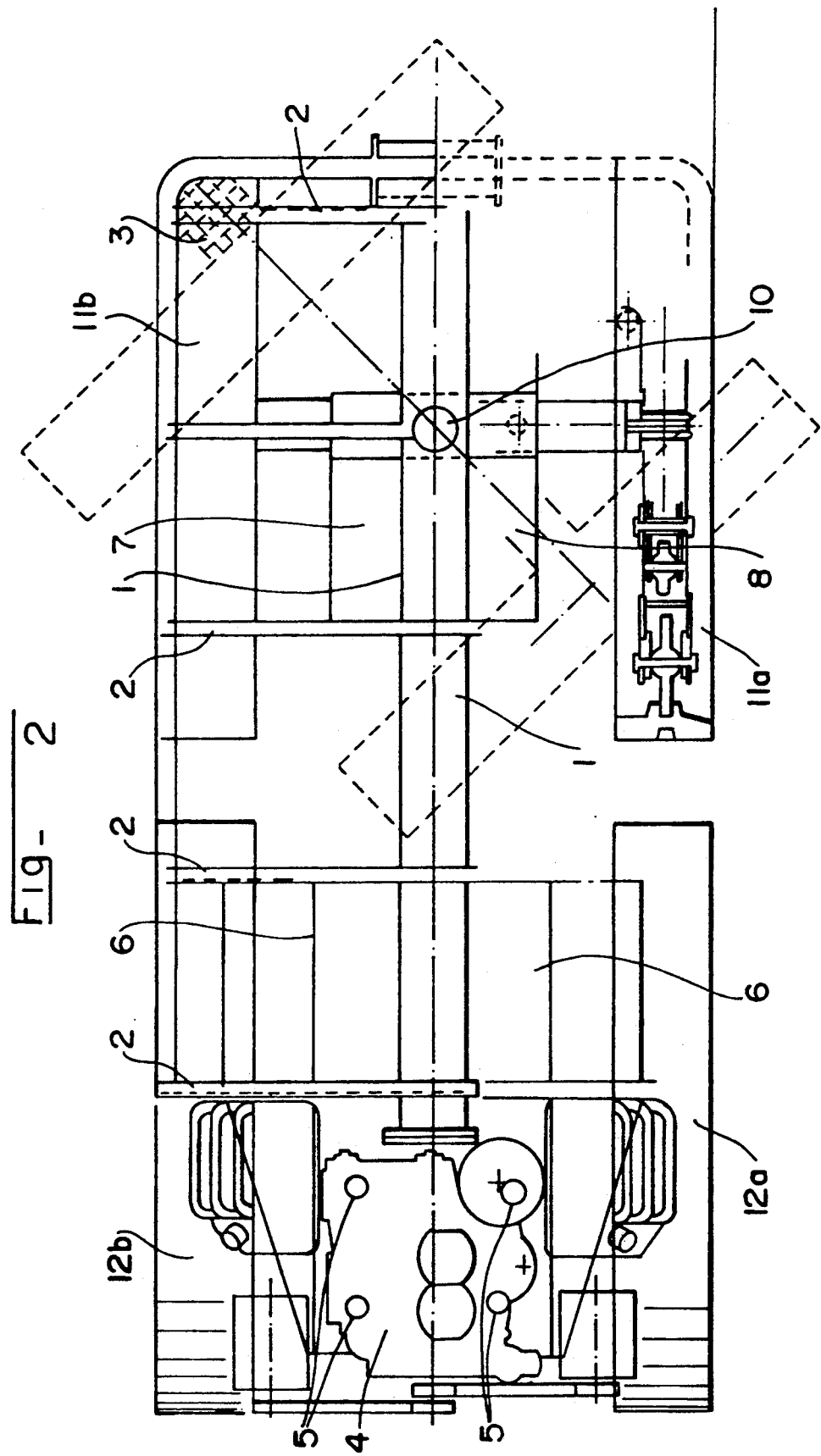
FIG. 2 is a planar view of FIG. 1.

As is shown in FIGS. 1 and 2, the vehicle with independent tracks according to the invention comprises a chassis supported by four tracks 11a-11b, 12a-12b, at least two of which constitute the front train or the rear train of the vehicle, are orientable, the latter being constituted, preferably of two tracks 11a, 11b of the front drive. Each track is moved by an independent hydraulic motor.

The chassis of the vehicle is composed of a square or any other shaped central girder 1, on which an assembly of frames 2 that receives the load board 3 comes to rest.

At its rear section, the chassis supports a diesel motor 4, for example of 46 CV, mounted on a rubber, or any other shock absorber 5.

A case of hydraulic oil 6, for example of a capacity of 110 liters, rests on the central girder, at the rear. A compartment 7 that is supposed to hold the electric equipment and the batteries 8 is provided for in the front.

A cylindrical tube 9 is affixed dependently to the central girder at the rear, in its lower part. It acts as a support to the two rear track banks. A known device enables the rear path of the vehicle to be changed, that is to say, it enables the separation between the tracks of the rear train of the vehicle.

The central girder is through-cut perceptibly at its front quarter and supports the steering bush 10.

Figure 3:
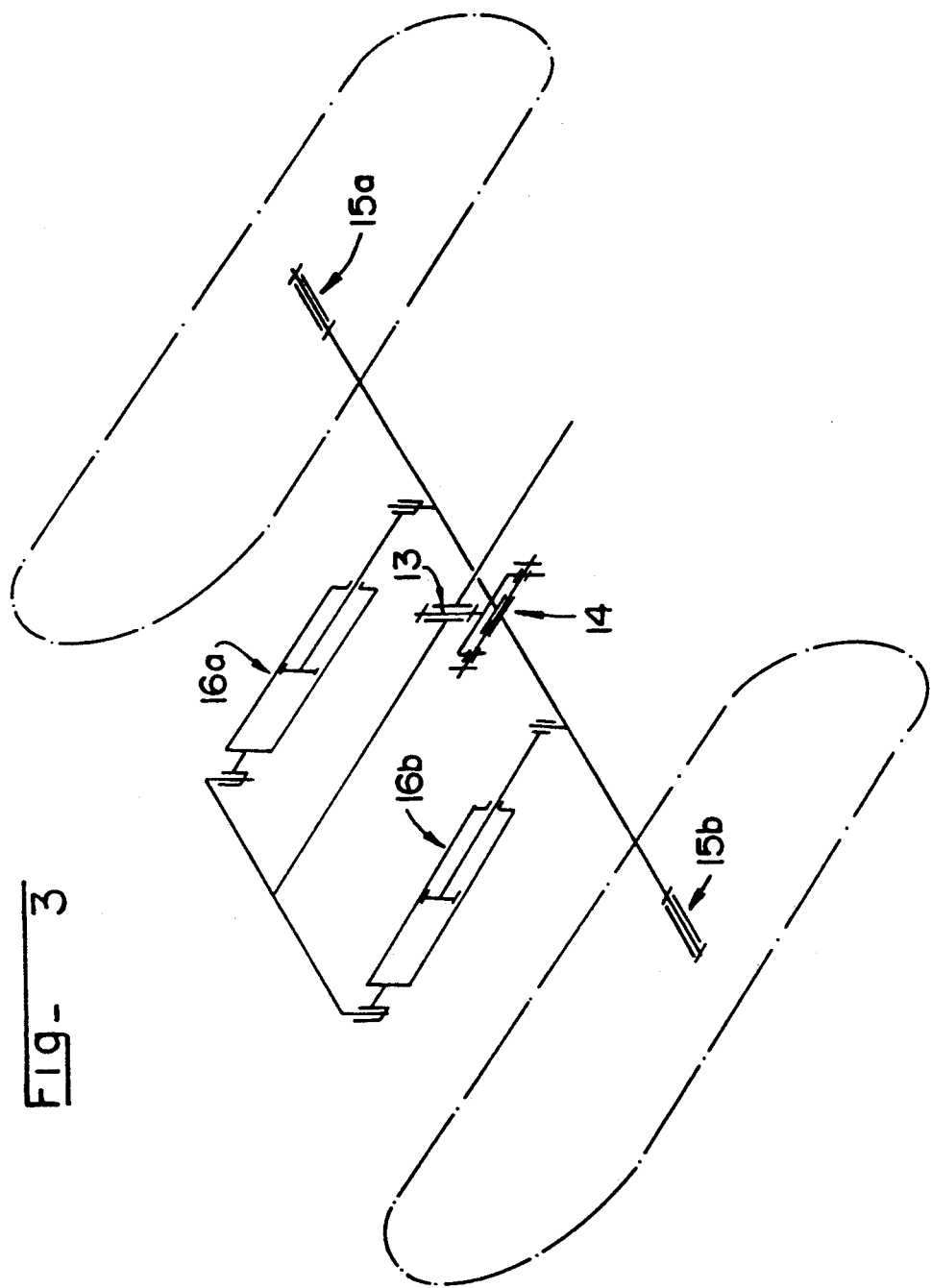
FIG. 3 is a diagrammatic view illustrating an example of articulation of the train of the front tracks.

FIG. 3 shows an example of the articulation of the front track train. The illustrated layout includes:

a vertical axis 13 allowing the direction-wise orientation of the front two tracks;

a longitudinal axis 14 allowing contact to be maintained with the ground in case of a sharp lateral gradient;

transverse axes 15a and 15b allowing the longitudinal tracking of the surface; and the hydraulic jacks 16a and 16b controlling the steering of the front train.

Figure 4:
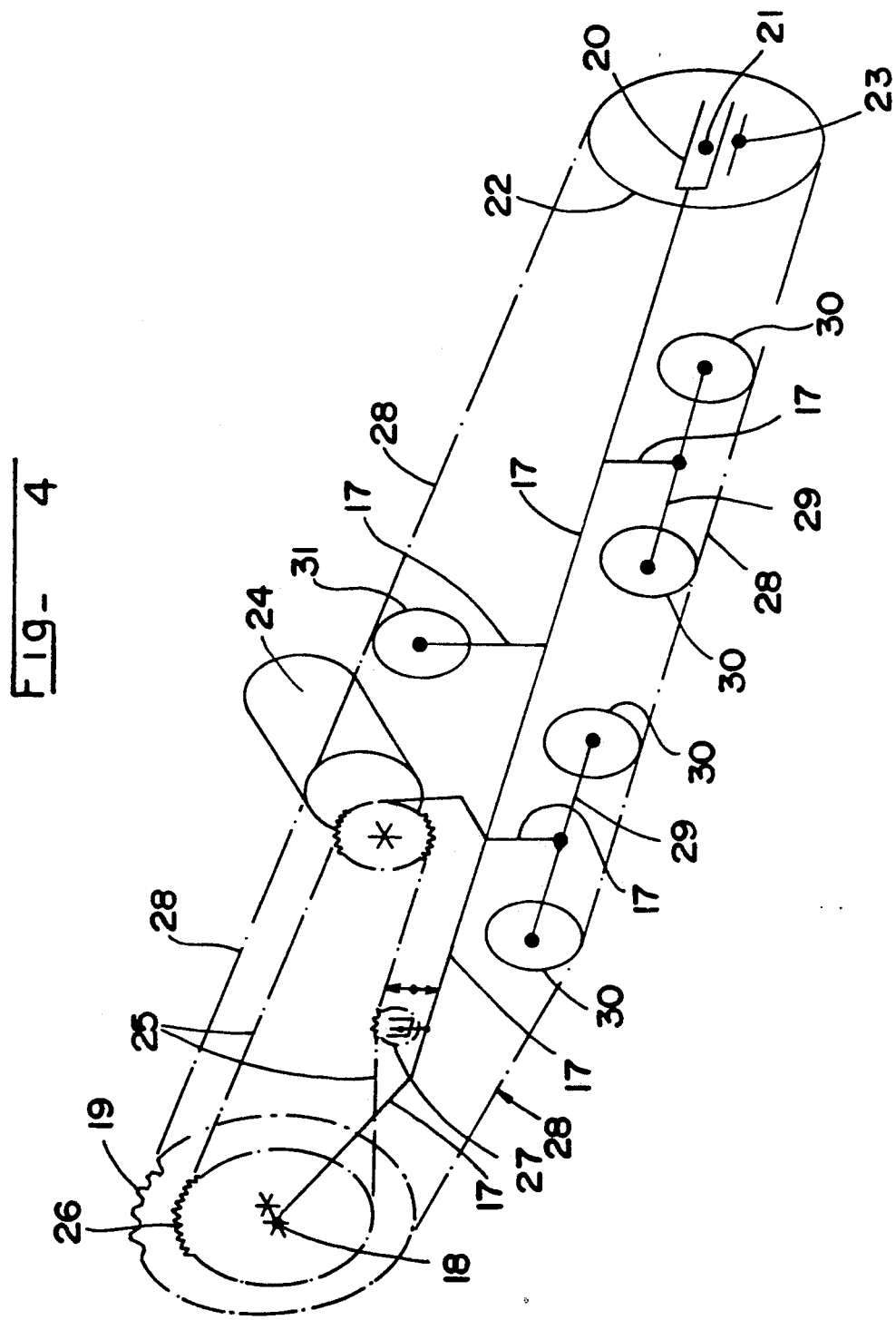
FIG. 4 is a diagrammatic view illustrating the composition of the bank of tracks.

As is shown in FIG. 4, each tracked bank is constituted of a chassis made of mecano-welded sheet 17. The chassis supports, in the front, axis 18 of chain wheel 19. In its rear section, two scallopings in the shape of an "U"20 lie horizontally, and serve as sliding rack into which glide two bearings 21 that support the axis of the rear roller 22 of the track bank. These two bearings ensure track tension, with the help of a screw-bolt system 23.

A hydraulic motor 24 located in the front quarter of the bank drives chain wheel 19 via a chain 25 and a sprocket or a ring 26 dependent on the chain wheel. A sprocket 27 whose position can be adjusted, ensures the tension of the chain.

Chain wheel 19 drives track 28.

The bogies 29 on which rollers 30 are fixed allow the track to maintain permanent contact with the ground.

A roller 31 allows the track not to drift at its upper parts.

EXAMPLE OF EMBODIMENT OF THE ENERGY SUBSYSTEM

According to the invention, the energy center of the vehicle is used in order to ensure, both together or separately, the propulsion of the vehicle, that is to say, the supply of the hydraulic motors 24 (FIG. 4) ensuring the drive of the bank of tracks, and the functioning of the tools on board the said vehicle (for example: control arm, slicing lathe, water pumps, water jets, perforators, hammers, etc.).

Figure 5:
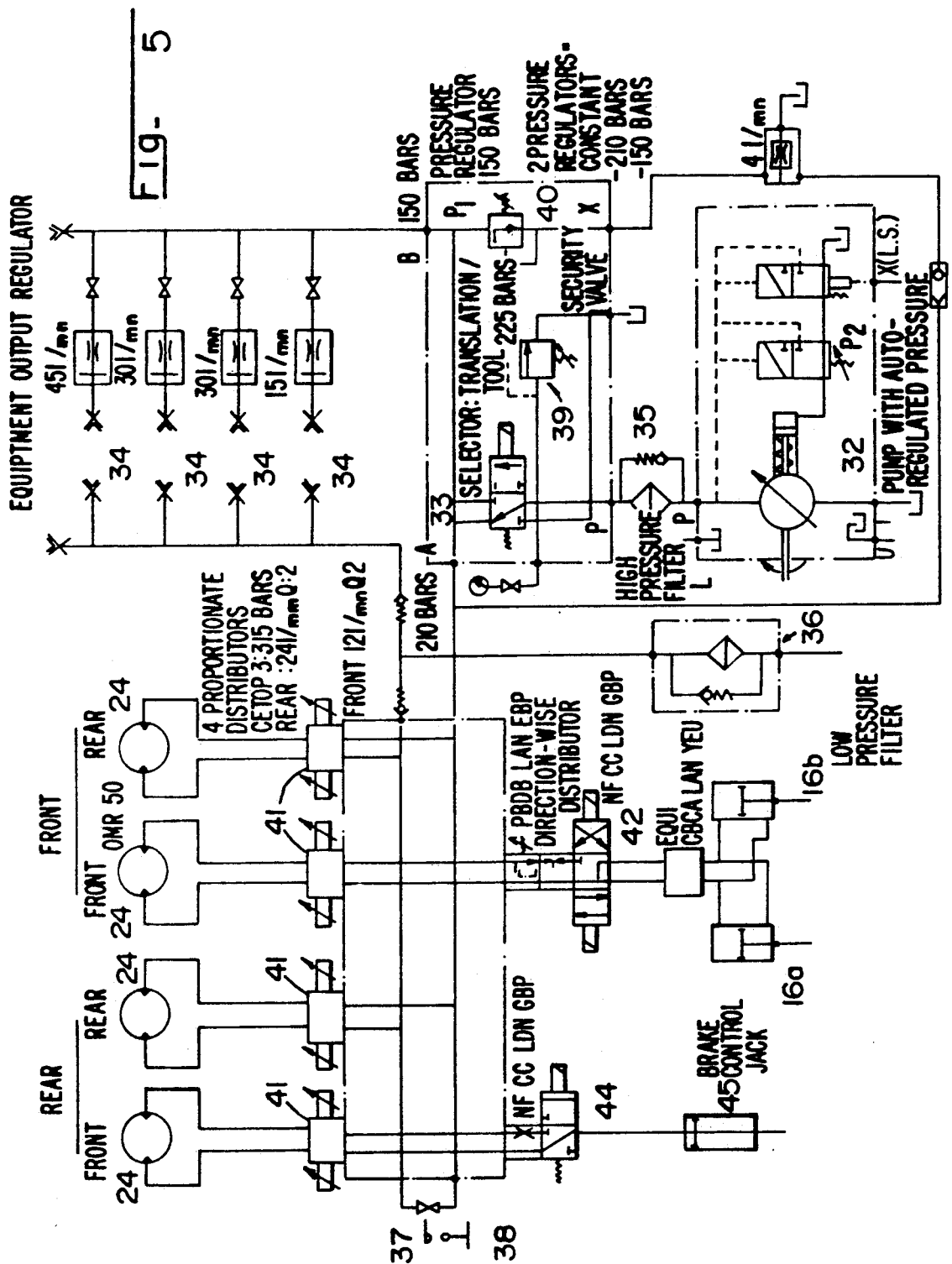
FIG. 5 is a layout of an embodiment of a hydraulic subsystem.

FIG. 5 shows an embodiment of a hydraulic subsystem and of the electro-mechanical automatic control organs, that ensure:

the conversion of the mechanical energy of diesel motor 4 (FIGS. 1 and 2) into hydraulic energy by driving a single pump 52 whose pressure and output is automatically regulated, and which is therefore capable of ensuring, both the drive of the rolling organs of the vehicle and that of the diverse tools that may equip the same, according to its destination, and the distribution of the hydraulic energy produced by pump 32 through a selector 33, either towards the translation motors 24, or towards the external equipment plugs 34, or towards both of them at the same time.

This device or subsystem also includes especially:

two filters that are supposed to eliminate the impurities of the hydraulic fluid, that is:
a high-pressure filter 35;
a low-pressure filter 36;

a circulation valve 37 that allows the diesel motor to be started with a hydraulic pump that is not under pressure;

an electric contactor 38 that does not allow the motor to be started without valve 37 being in an open position;

a security valve 39 that allows excess pressure in the hydraulic circuit to be avoided (225 bars);

a pressure regulator 40 that, when selector 33 is in a position to allow the external tools to be supplied, makes the hydraulic pressure fall, for example to 150 bars;

four proportionate electro-distributors 41 that feed the hydraulic motors 24 of the tracks according to the control current applied to the solenoidal winders of the electro-distributors;

an electro-distributor 42 with two working positions (left, right) and a resting position, that allows the two steering jacks 16a, 16b of front track drives 11a and 11b to be controlled; and an electro-distributor 44 that allows the control jack of brake 45 of the said vehicle to be piloted.

ELECTRIC CONTROL-CHECK DEVICE

Figure 6:
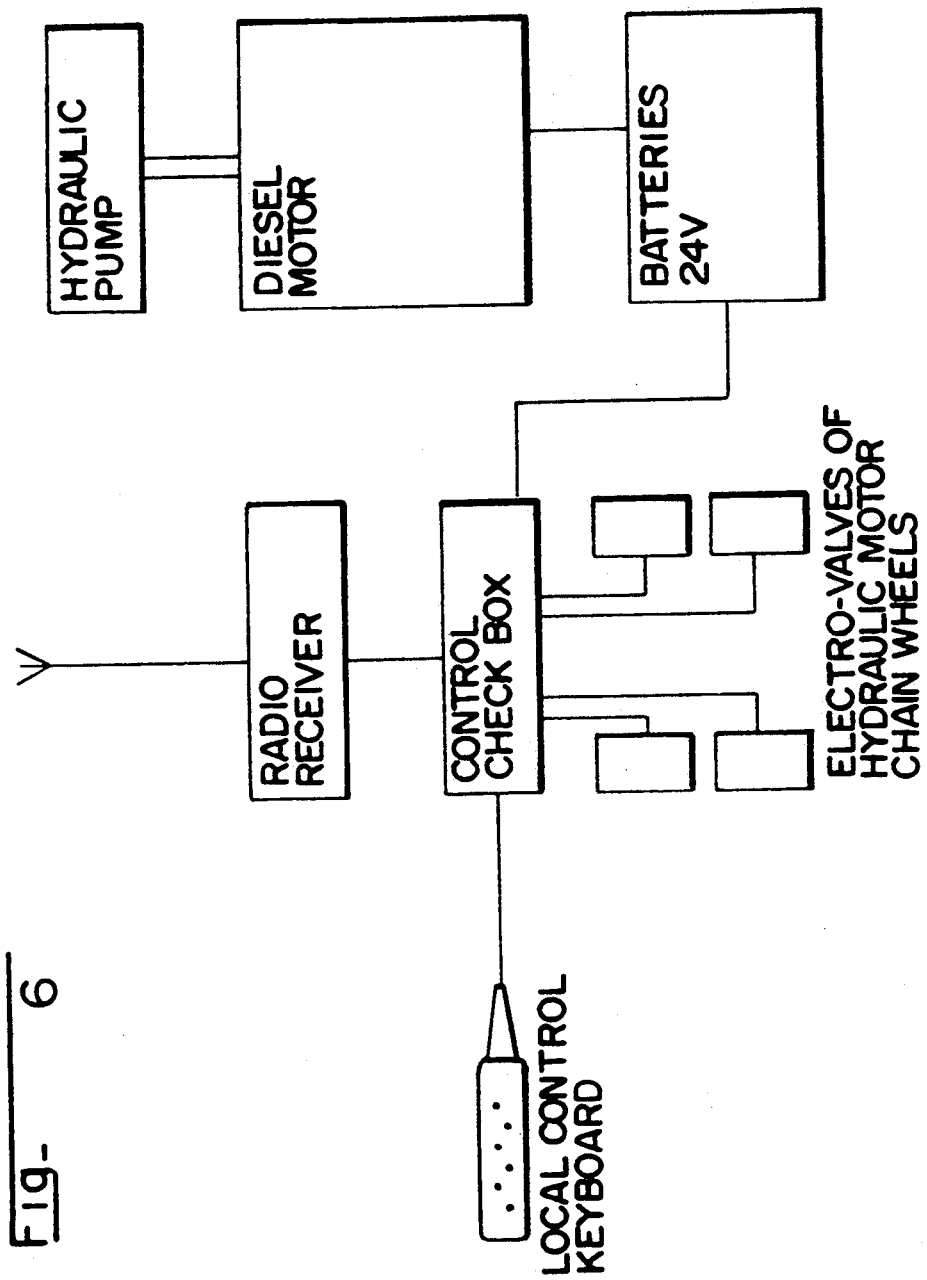
FIG. 6 is a diagrammatic view of the entire control-check device.

FIG. 6 is a general view of the control-check device.

The difficulty in controlling the four independent tracks rests in the fact that they have different speeds when the vehicle is taking a turn.

If $V0$ = base speed, the respective speeds of the tracks are proved to be:

front interior track at a turn $$V1 = V0 (1 - A \times SIN (D)/2 \times E);$$

front exterior track at a turn $$V2 = V0 (1 + A \times SIN (D)/2 \times E);$$

rear interior track at a turn $$V3 = V0 (Cos (D) - B \times SIN(D)/2 \times E);$$

rear exterior track at a turn $$V4 = V0 (Cos (D) + B \times SIN(D)/2 \times E)$$

wherein in which of the formulas:

A = Distance between chain wheels of front tracks;
B = Distance between chain wheels of rear tracks; and
E = Axle base and
D = Steering angle.

Figure 7:
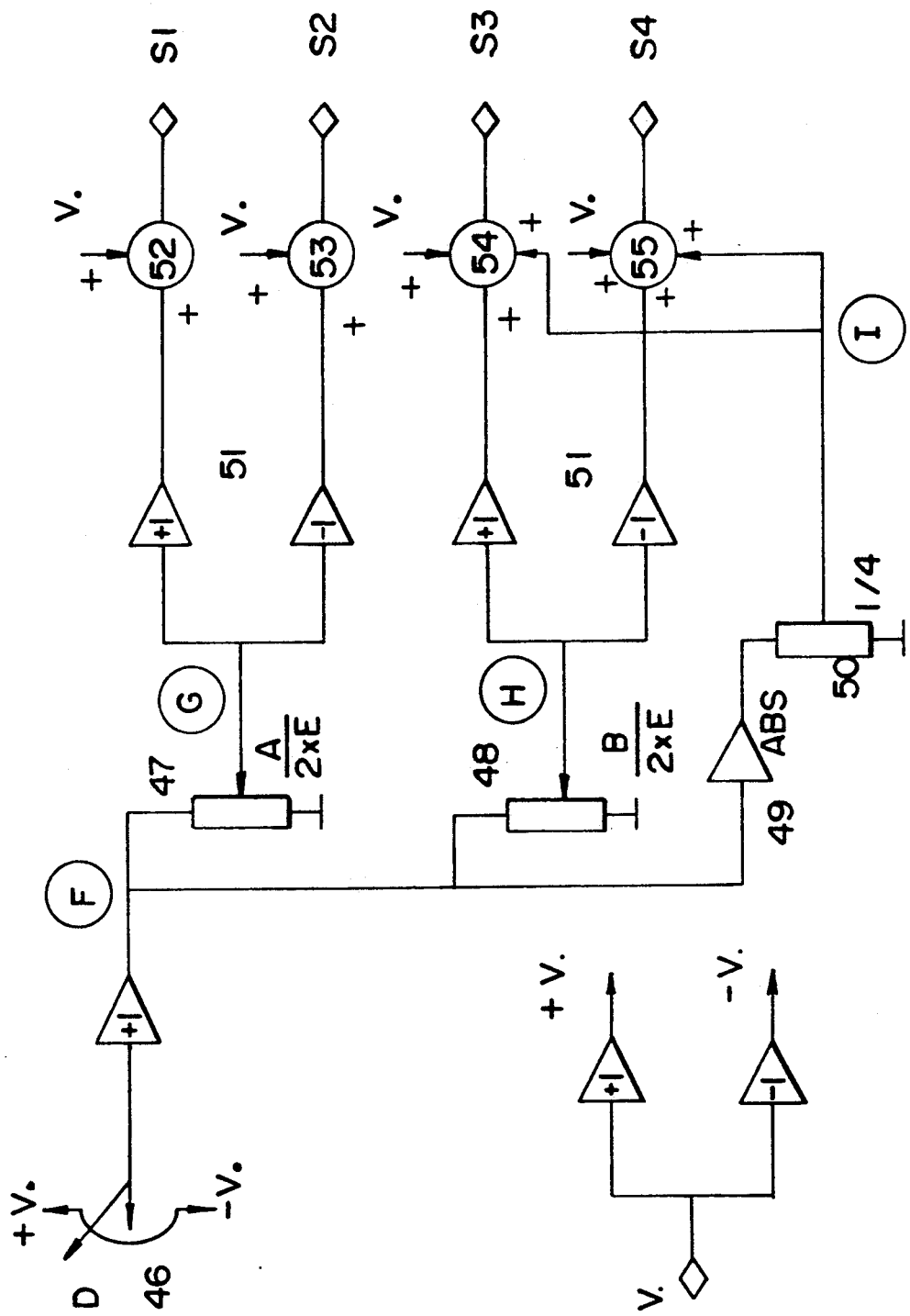
FIG. 7 is a detailed diagram of the electronic control circuits of the tracks.

FIG. 7 represents an electronic card that allows the set point of the electronic signals to be generated from the proportionate control electro-valves, according to the set point of speed V0 and the steering angle "D".

The composition of this electronic card and its working principles are the following:

A potentiometer 46 generates voltage at point "F", that is equal to the angle of orientation of the front drive "D" multiplied by the set point of speed V0;

A resistance divider bridge 47 allows a voltage equal to V0 (D ×A)/(2 ×E) to be had at point "G";

A resistance divider bridge 48 allows a voltage equal to V0 (D ×B)/(2 ×E) to be had at point "H";

A rectifier circuit 49 followed by a divider bridge 50 allows a voltage equal to the absolute value of D/4 multiplied by the set point of speed V0 to be had at point "I";

Circuits 51 allow the addition or subtraction of unit values to signals from point "G" and "H";

An integrator 52 at the lead of S1 for which a signal equal to the following can be had:

$$S1 = V0 (1 - (A \times D)/(2 \times E));$$

An integrator 53 at the lead of S2 from which a signal equal to the following can be had:

$$S2 = V0 (1 + (A \times D)/(2 \times E));$$

An integrator 54 at the lead of S3 from which a signal equal to the following can be had:

$$S3 = V0 (1 - ABS(D)/4 - (B \times D)/(2 \times E)).$$

and

An integrator 55 at the lead of S4 from which a signal equal to the following can be had:

$$S4 = (1 - ABS(D)/4 + (B \times D)/(2 \times E)).$$

Signals S1, S2, S3 and S4 are respectively the control signals of the proportionate electro-valves or the proportionate electro-distributors of the tracks:
Front left (S1);
Front right (S2);
Rear left (S3); and
Rear right (S4).

It is easy to verify by calculation that these signals S1, S2, S3 and S4 "approximate" or approach the values of speeds V1, V2, V3 and V4. The errors are less than 5% for steering angles less than 35 degrees.

The electronic device that we have just described allows the differential piloting of the four tracks, and takes into account the real distance travelled by each of them.

Figure 8:
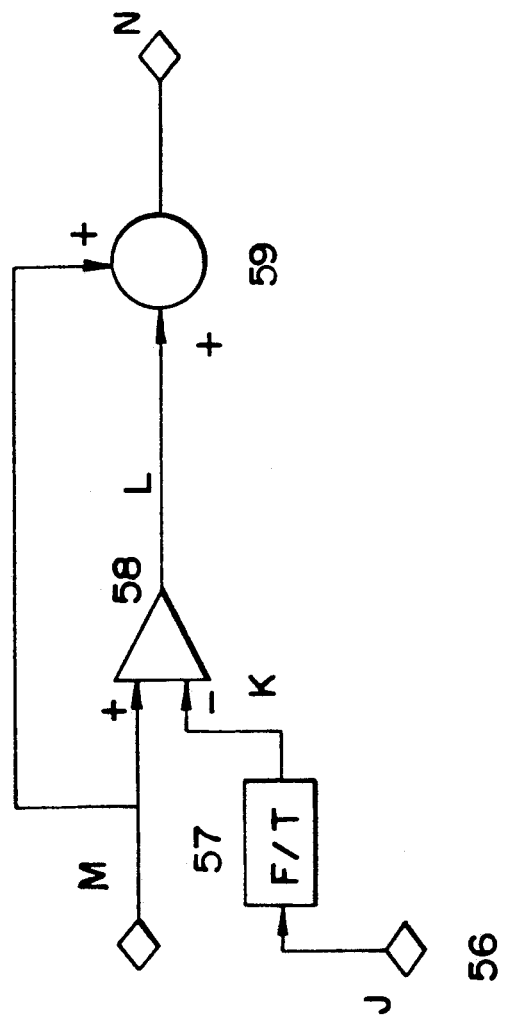
FIG. 8 is a diagram of the principle of a closed loop automatic control system.

FIG. 8 details the composition and the working principles of a closed loop automatic control system for the speed of the tracks.

A proximity detector 56 located on each track bank, in front of the chain wheel, generates an alternative voltage "J" at each passage of a tooth of the chain wheel or of the drive ring or sprocket 26 (FIG. 4) of the latter.

A voltage frequency convertor 57 generates a continuous voltage "K" proportionate to the speed of rotation of the chain wheel.

A comparator circuit 58 calculates the error signal L between the set point voltage M and measurement K:

$$\text{Error (L)} = M - K$$

An adder circuit 59 generates a control voltage "N" that pilots the proportionate servo-valve 41 (FIG. 5) of the train of the corresponding track.

The advantage of this device, is that, in case a track loses contact with the ground, it does not run light by absorbing all the hydraulic output of the pump. Actually, if K is greater than M, L will be negative and, control signal N will be diminished, and thus ensure the slowing down of the track.

The telecontrolled tracked vehicle controlled automatically and moves with a lot of flexibility with each drive track receiving all the power that it can use can be telecontrolled either via a cable or via a classic radio-controlled device.

I claim:

1. A telecontrolled tracked vehicle supported by a plurality of tracked banks, each of said tracked banks comprising chain wheels and each driven by independent first drive means, wherein at least one of said tracked banks is directionally orientable and wherein at least one of said tracked banks is also orientable in a longitudinal offset around a transverse axis, comprising: control means for controlling said tracked banks, said control means determining the speed of each of said tracked banks according to: the position of said tracked bank; the determination of whether said tracked bank is orientable or not; the geometry of said vehicle; a set point of a base speed (V0); and the steering angle of said orientable tracked bank.

2. A telecontrolled tracked vehicle according to claim 1, further comprising a pair of orientable front tracked banks and a pair of non-orientable rear tracked banks, wherein said control means comprises:
a potentiometer that provides a voltage to be generated that is substantially equal to the angle of orientation (D) of said front tracks multiplied by said set point of speed (V0);
a first resistance driver bridge that provides a voltage substantially equal to $V0(D \times A)/(2 \times E)$;
a second resistance divider bridge that provides a voltage substantially equal to $V0 (D \times B)/2 \times E)$;
a rectifier circuit followed by a divider bridge that provides a voltage substantially equal to the absolute value of D/4 multiplied by said set point of speed;
circuits that allow the addition or subtraction of a unit value to said voltage signals provided by said first and said second resistance divider bridge;
an integrator at a first lead from which the following signal is provided:

$$S1 = V0 (1 - (A \times D)/(2 \times E));$$

an integrator at a second lead from which the following signal is provided:

$$S2 = V0 (1 + (A \times D)/2 \times E));$$

an integrator at a third lead from which the following signal is provided:

$$S3 = V0 (1 - ABS(D)/4 - (B \times D)/(2 \times D));$$

an integrator at a fourth lead from which the following signal is provided:

$$S4 = V0 (1 - ABS(D)/4 + (B \times D)/(2 \times E));$$

wherein signals S1, S2, S3 and S4 are respectively control signals of proportionate electro-valves or proprotionate electro-distributors of the left tracked bank and the right tracked bank of said pair of orientable front tracked banks and the left tracked bank and the right tracked bank of said pair of non-orientable rear tracked banks, and wherein A is substantially equal to a distance between said chain wheels of said front tracks, B is substantially equal to a distance between said chain wheels of said rear tracks and E is substantially equal to an axle base.

3. A telecontrolled tracked vehicle according to claim 2, further comprising a closed loop automatic control system of the speed of said tracks, said control system comprising:
a proximity detector located on each of said tracked banks, in front of at least one of said chain wheels, allowing an alternating voltage to be generated at each passage of a tooth of said chain wheel or of a drive cap or sprocket of said chain wheel;

a voltage-frequency controller that provides a continuous voltage to be generated proportionate to the speed of rotation of said chain wheel;

a comparator circuit that calculates a signal of error between a set point voltage and said continuous voltage from said voltage-frequency controller; and an adder circuit that allows a control voltage to be generated that controls a proportionate servo-valve of said tracked bank.

4. A telecontrolled tracked vehicle according to claim 1, further comprising means for supplying energy for the propulsion of said vehicle and for the functioning of tools provided on board said vehicle.

5. A telecontrolled tracked vehicle according to claim 4, wherein said energy supply means comprises a hydraulic subsystem that ensures the conversion of mechanical energy of a second drive means into hydraulic energy and the distribution of said hydraulic energy for driving said tracked banks and said tools, said hydraulic subsystem comprising:

a single pump, whose pressure and output are auto-regulated, driven by said second drive means of said vehicle;

a selector that allows the distribution of said hydraulic energy either towards said first drive means of said vehicle, or towards external plugs of said tools that equip said vehicle, or towards said first drive means and said plugs at the same time;

a circulation drive valve that allows said second drive means to be started with a hydraulic pump that is not under pressure;

an electric switch that only allows said second drive means to be started if said circulation valve is in an open position;

a pressure regulator that, when said selector is in a position that allows said external tools to be supplied with energy, makes the hydraulic pressure drop; and four proportionate electro-distributors that feed said first drive means according to a control current applied to solenoidal winders of a pair of electro-distributors, wherein one of said electro-distributors comprises two working positions and a resting position that allows two steering jacks of said pair of orientable front tracked banks to be controlled.

6. A telecontrolled tracked vehicle according to claim 5, wherein one of said electro-distributors enables a brake control jack of said vehicle to be piloted.

7. A telecontrolled tracked vehicle according to claim 1, wherein said tracked banks are orientable directionally and are also orientable in a lateral offset, around a longitudinal axis.

* * * * *